I. Town.
Building Blocks.
N° 3,762.  Patented Sept. 27, 1844.
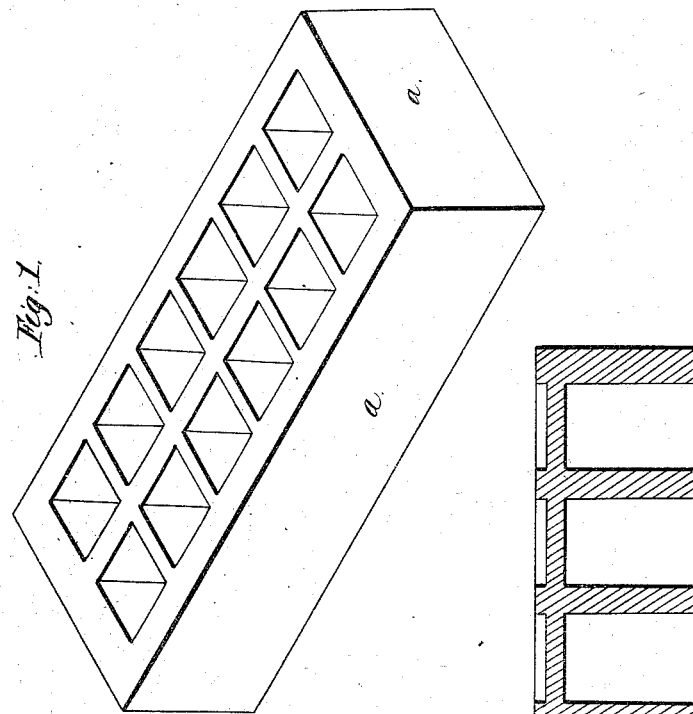
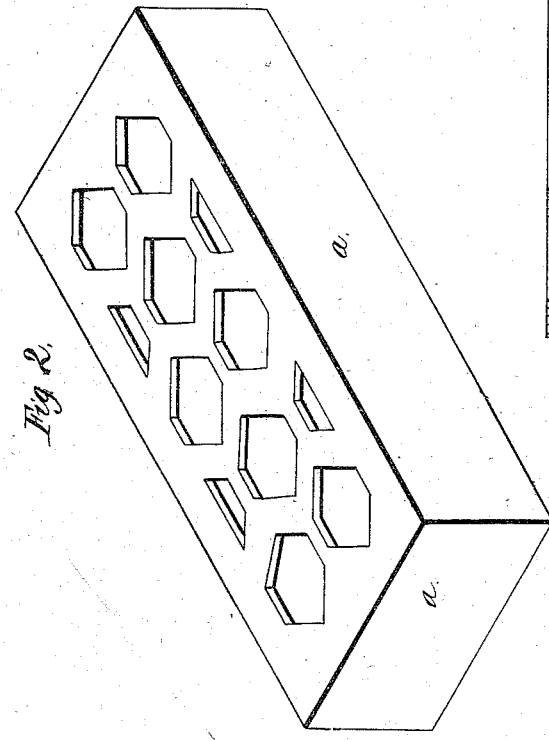
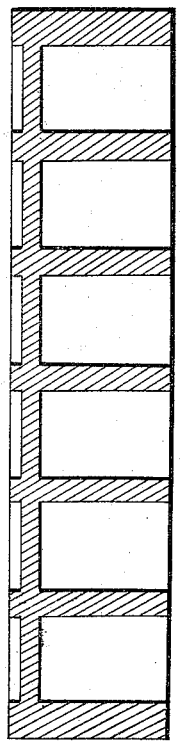

UNITED STATES PATENT OFFICE.

WILLIAM T. PETERS, OF NEW HAVEN, CONNECTICUT, EXECUTOR OF ITHIEL TOWN, DECEASED.

MOLDING OF BRICKS.

Specification of Letters Patent No. 3,762, dated September 27, 1844.

*To all whom it may concern:*

Be it known that ITHIEL TOWN, late of New Haven, in the county of New Haven, State of Connecticut, deceased, did invent a new and useful Improvement in the Form and Manufacture of Bricks; and I, WILLIAM T. PETERS, do hereby declare that the following is a description thereof as communicated to me by said ITHIEL TOWN, reference being had to the accompanying drawings.

The nature of this invention consists in forming bricks hollow, with cross partitions therein which strengthen the outside of said bricks, by which means they can be made lighter, burned more equally, and rapidly and be at the same time of sufficient strength.

The construction is as follows. The bricks can be molded in any suitable mold and by any machinery which is now used for that purpose. The form of the exterior $a$, $a$, can be oblong, square, or other shape as shown in Figures 1, 2, 3 and of every other form required, and of any thickness, but ⅝ of an inch I deem sufficient for the thickness of the sides and partitions. The sides may be made straight or otherwise on the underside or that which when in the wall is downward. There are holes that are pierced to the upper side entirely through or nearly so, as may be deemed advisable.

These holes may be pierced from any side and may be square, round, or polygonal, but the form which I deem most preferable is a hexagon. These holes may be of any size and of the same or different dimensions at top and bottom being made a sufficient distance apart for a partition sufficiently strong between them. The holes may be larger or smaller in proportion to the thickness of the partitions, but should remove at least one half of the material of a solid brick. A portion of clay left near the top above the holes may form a horizontal partition and on the top there may be slight depressions the same size as the holes and opposite to them. This horizontal partition is for the purpose of holding mortar and preventing waste, but is not absolutely essential to the plan. Horizontal partitions may be made in any part of the brick required.

It will be obvious that the brick will be more equally burned, more rapidly, and with less expenditure of fuel and by this means bricks of almost any size can be manufactured without danger of warping and they will be found much more light to handle than those of ordinary manufacture.

Having thus fully described the improvement of the said ITHIEL TOWN what I claim therein as new and desire to secure by Letters Patent is—

The method of constructing bricks of the forms herein described in the manner and for the purpose set forth having the interior hollow and intersected with partitions as described.

WM. T. PETERS,
*Executor of the estate of Ithiel Town.*

Witnesses:
W. H. BAYLISS,
JAMES JOHN ESTERBROOK.